(12) United States Patent
Perry

(10) Patent No.: US 7,057,199 B2
(45) Date of Patent: Jun. 6, 2006

(54) APPARATUS AND METHOD FOR THE MEASUREMENT OF WATER DEPTH USING A CONTROLLED RECEIVER

(75) Inventor: John Gavin Perry, Valley View (AU)

(73) Assignee: Tenix Lads Corporation Pty Ltd., Mawson Lakes (AU)

(*) Notice: Subject to any disclaimer, the term of this patent is extended or adjusted under 35 U.S.C. 154(b) by 0 days.

(21) Appl. No.: 10/503,547

(22) PCT Filed: Jan. 21, 2003

(86) PCT No.: PCT/AU03/00060

§ 371 (c)(1),
(2), (4) Date: Jan. 4, 2005

(87) PCT Pub. No.: WO03/065069

PCT Pub. Date: Aug. 7, 2003

(65) Prior Publication Data

US 2005/0128369 A1 Jun. 16, 2005

(30) Foreign Application Priority Data

Feb. 1, 2002 (AU) .................................... PS0220

(51) Int. Cl.
*G01N 21/85* (2006.01)
*H01J 3/36* (2006.01)

(52) U.S. Cl. ..................................... 250/577; 250/216

(58) Field of Classification Search ................ 250/577, 250/573, 227.26, 227.06, 216; 348/81, 296; 356/5.04

See application file for complete search history.

(56) References Cited

U.S. PATENT DOCUMENTS

| 4,754,151 A | * | 6/1988 | Billard | 250/574 |
| 4,771,338 A | * | 9/1988 | Fujiwara | 358/474 |
| 4,836,629 A | * | 6/1989 | Huignard et al. | 359/15 |
| 5,034,810 A | * | 7/1991 | Keeler | 348/31 |
| 6,005,990 A | * | 12/1999 | Barrett et al. | 382/323 |
| 6,091,405 A | * | 7/2000 | Lowe et al. | 345/175 |

* cited by examiner

*Primary Examiner*—Kevin Pyo
(74) *Attorney, Agent, or Firm*—Quarles & Brady LLP

(57) ABSTRACT

An Laser Airborne Depth Sounder (LADS) system for the measurement of water depth is disclosed, the system includes a transmitter and a receiver of laser light having at least two wavelengths so as to receive a first reflection from a water surface and a second reflection from a water bottom an a rotating mirror which directs the laser light to the water and receives the second reflection of the laser light from the water bottom and directs the second reflection to the receiver, where the receiver includes an optical shutter (76) adapted for selectively allowing the passage of the second reflection laser light therethrough. The shutter (76) may include a LCD matrix or mechanical light blocking elements. The LCD matrix may be arranged in a central circle (82), an inner ring (80), and an outer ring (78).

10 Claims, 4 Drawing Sheets

APPARATUS AND METHOD FOR THE MEASUREMENT OF WATER DEPTH USING A CONTROLLED RECEIVER

The present invention relates to an improved apparatus and method for the measurement of water depth using a controlled receiver that controls the size and shape of the field of view, steers the central field of view of the receiver and controls its spatial density. The present invention also relates to a controllable receiver or optical shutter employed in such a configuration.

BACKGROUND OF THE INVENTION

Laser Airborne Depth Sounder (LADS) systems are used to measure water depth, i.e. the distance between a water surface and the bottom located beneath the surface. This depth measuring capability may be extended to also measure the height of land, and it is understood that the following descriptions that refer to the measurement of water depth can also encompass land height measurement.

The LADS systems contain measuring equipment that is mounted within an aircraft. Typically a fixed wing aircraft is used. During flight, the equipment measures over a vast area the depth at "sounding" positions. These sounding positions are typically in the form of a rectilinear grid pattern that has a 5 m×5 m grid spacing. Typical depth of water that can be measured by the systems is up to 70 m. The position of each sounding is determined with a Global Positioning System (GPS) and recorded with the associated measured depth. This "sounding" data is stored on appropriate media for later evaluation, e.g. digital tape.

The measuring equipment includes a laser that is pointed in a direction downward from the aircraft towards the water. The laser light is pulsed and directed to a sounding position by a primary mirror. Oscillating this mirror about two axes whilst the aircraft is flying creates the grid pattern of sounding on water. The spacing between the soundings also depends on the aircraft altitude, the aircraft forward speed, the frequency, and amplitude of oscillation of the primary mirror and the pulse rate of the laser. Due to design constraints of the LADS system, the primary mirror has a relatively large moment of inertia, which limits the rate at which the primary mirror can be oscillated. This limits the minimum spacing that can be achieved between laser soundings.

In co-pending application, whose contents are incorporated by reference therein, and entitled "An apparatus and method for oscillating a transmitted laser beam of light within the Field of View (FOV) of a light receiving system" the applicant disclosed an improvement in the scanning resolution of the system by using an additional or secondary mirror that dithers the green laser pulse prior to it being transmitted.

One difficulty with that system is that the receiver is not being steered accordingly.

Furthermore, in some instances, there are strong surface reflections in the field of view that may require spatial sensitivity adjustment of the receiver.

In addition it may be desirable to provide a size and shape (scaling) of the field of view to capture the optical energy of interest.

It is an object of the present invention to overcome the above-mentioned problems or at least provide the public with a useful alternative.

It is a further object of the present invention to provide a receiver whose size and shape can be controlled thereby controlling the field of view of the receiver.

SUMMARY OF THE INVENTION

In one form of the invention there is proposed an optical shutter for selectively and controllably allowing the passage of optical radiation therethrough, said shutter including:
a first central element and at least one outer element surrounding said first element, said elements being operable between a first and a second configuration, in said first configuration allowing for the passage of said optical radiation therethrough and in said second configuration blocking of said optical radiation therethrough.

In preference said elements are Liquid Crystal Display (LCD) elements.

In preference said first central element is in the form of a central circle, and said outer elements are in the form of an inner ring surrounding said central circle and an outer ring surrounding said inner ring.

In preference said inner ring and said outer ring are further divided into individual arrays.

Preferably said arrays are quadrants.

Preferably said central circle includes parallel bands of LCD elements.

In preference said elements are individually operable to allow a user to select unique patterns of surface area in the shutter for the passage of light therethrough.

In a further form of the invention there is proposed an apparatus for the measurement of water depth between a water surface and water bottom said apparatus adapted to be mounted on a flying platform above the water surface and including:
a transmitter and a receiver of laser light having at least two wavelengths so as to receive a first reflection from the water surface and a second reflection from the bottom of said water surface;
a primary mirror adapted to oscillate in at least one axis so as to direct laser light to the water in a pattern and further adapted to receive said second reflection of the laser light from the water bottom and direct said second reflection to said receiver;
said receiver including an optical shutter including a first central circular element, an inner annular element circumferentially surrounding said circular element and an outer annular element circumferentially surrounding said inner annular element, said shutter adapted for selectively and controllably allowing the passage of said second reflection laser light therethrough, said optical shutter including a plurality of light blocking elements arranged into circular bands.

In preference said optical shutter selectively allows the passage of said second reflection at a rate that is synchronized with the oscillation frequency of said primary mirror.

In preference said optical shutter includes a plurality of horizontal sets of LCD elements in a parallel band type arrangement.

In preference said optical shutter is positioned at or near the focal plane of said receiver.

The skilled addressee should now appreciate that scaling can be achieved by selecting the total effective area (size and shape) of the shutter. Thus steering is achieved by selecting the location of the area of the shutter through which optical energy is allowed to pass. The relative spatial sensitivity is achieved by adjusting relative areas of the shutter through which the optical energy is allowed to pass.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Typically mounted in an aircraft a laser fires two laser beams, an infrared laser beam, and a green laser beam. The infrared laser beam is directed vertically downward from the system mounted in the aircraft. An infrared receiver inside the aircraft collects the light that is reflected from the surface of the water. The aircraft height above the mean sea surface level is measured from the time taken for the infrared light to travel from the aircraft to the water surface and back to the aircraft.

The green beam is reflected from both the water surface and the bottom of the water floor with the reflected light collected by a green receiver inside the aircraft. The depth of the water is calculated from the time difference between paths that the green laser beam travels to/from the surface and the bottom.

The typical survey using the LADS system generally creates a sounding pattern that is 240 meters wide with soundings on a 5 m×5 m grid, when the aircraft is flying at 175 knots at 1600 feet height. The LADS system can vary the amplitude and frequency of oscillation of the primary mirror (discussed below) to suit other sounding patterns.

During a survey, the primary oscillating mirror directs the outgoing and incoming green laser beam typically 20 degrees either side of vertical, in the transverse direction to the flight path. The mirror also directs the green laser beam parallel to the flight path to compensate for the forward speed of the aircraft.

Figure 1:
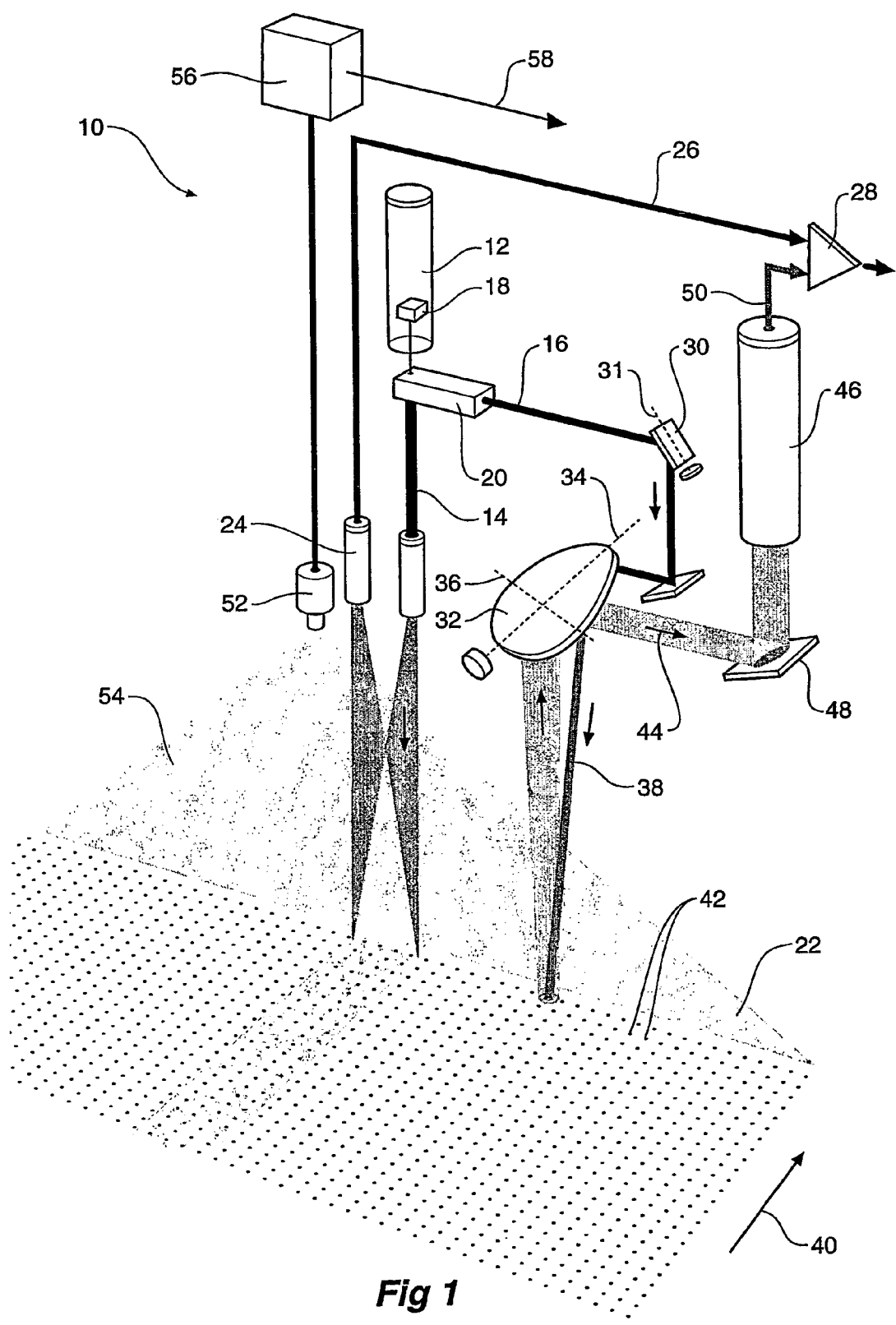
FIG. 1 is an illustrative representation of the LADS system.

The typical components of the system are illustrated in FIG. 1. The system 10 includes a laser 12 such as a Nd:YAG laser that produces an infrared laser beam 14 and a green beam 16, the latter produced using a frequency doubler 18 and passing though an optical coupler 20. The infrared laser beam 14 is reflected from the ocean surface 22 and is received by an infrared receiver 24. An infrared return signal 26 is then passed to a digitiser 28 for analysis.

The green laser beam 16 is directed to a secondary mirror (also called the delta or dithering mirror) 30, which oscillates around one axis 31 and directs the green laser beam 16 across the surface of the primary or scanning mirror 32. The primary mirror typically rotates around two axes, the major and the minor axis 34 and 36 respectively and is of elongate pear shaped construction so that it facilitates both transmission and reception of the optical energy 38.

Those skilled in the art will however appreciate that the secondary mirror 30 is but a preferred feature that increases the scanning resolution and that the system 10 can operate quite successfully without the secondary mirror 30.

Oscillation about the major axis 34 of the primary mirror 32 is used to direct the scan of the green laser beam 16 transverse to the aircraft direction 40. Oscillation about the primary mirror minor axis 36 is used to compensate for the forward movement of the aircraft. If the forward motion of the aircraft were not compensated for, then the laser scan 42 produced would be a non-rectilinear pattern in a plane parallel to the platform roll direction rather than the rectilinear scan pattern.

The green laser light 44 is reflected both from the sea surface and the sea bottom and is re-directed by the primary mirror 32 to a green receiver 46 using other optical components such as mirror 48. The green receiver 46 includes a photo multiplier (mounted within the green receiver) that converts the received light to a signal 50 to be then used to calculate the water surface depth.

To assist the operator of the scanning assembly a video camera 52 observes the sea surface 54 and provides that to the operator through video equipment 56 to an operator console 58.

Rotation about the major axis 34 of the scanning mirror 32 produces a transverse scan that swings the outgoing beam and incoming reflections a maximum of 20 degrees either side of vertical. The forward scan, or rotation about the minor axis 36, swings the outgoing beam and incoming reflections a maximum of 0.5 degrees either side of vertical, typically at a rate of 18 Hz. The mirror 32 is a relatively large mirror to provide the necessary large field of view thereby limiting the oscillating rate about the major axis 34.

The laser 12 typically generates an infrared laser pulse of 1064 nm that is frequency doubled to produce a green laser pulse of 532 nm. The infrared spot at the sea surface is nominally some 6 meters diameter. The green beam is typically 3 meters in diameter at the sea surface.

By controlling a shutter in the green receiver 46 one can effectively control the characteristics of the field of view of the receiver, namely the field of view steering, field of view size and shape (scaling), and the field of view spatial sensitivity.

Figure 2:
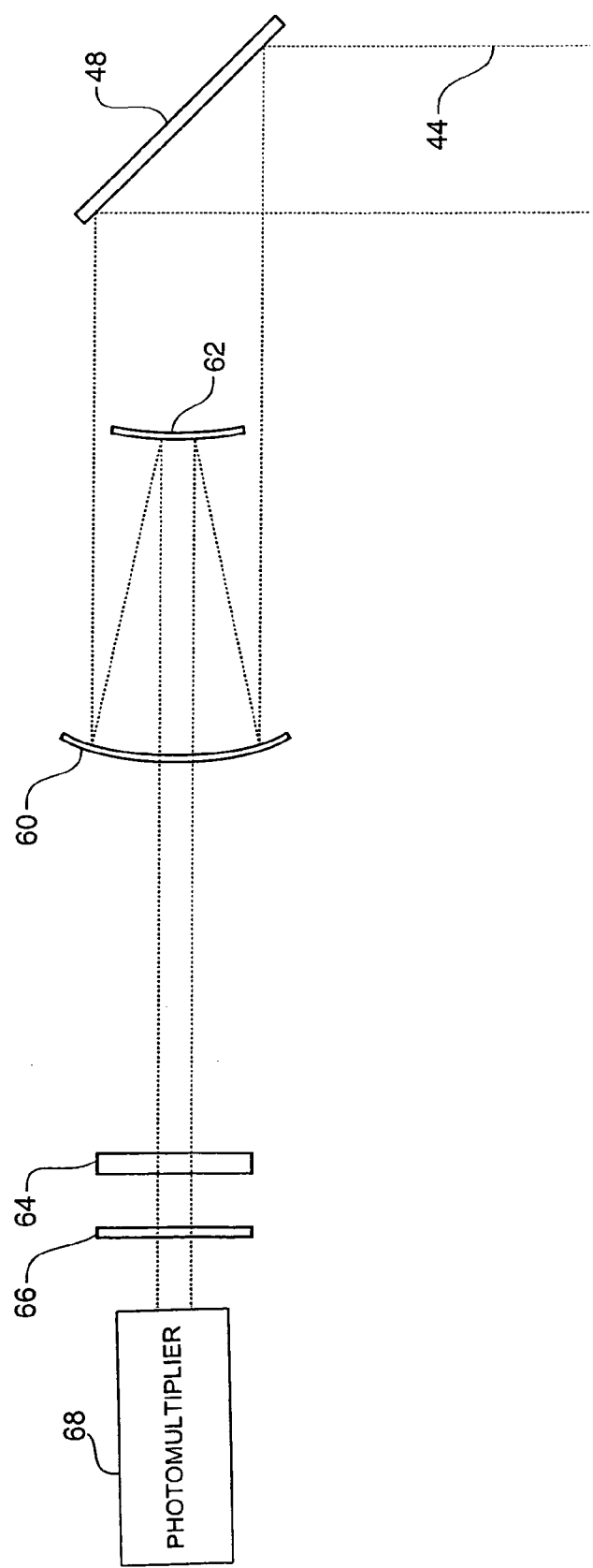
FIG. 2 is an schematic illustration of the receiver optical configuration incorporating a receiver shutter according to the present invention.

Illustrated in FIG. 2 is a schematic configuration of a green receiver 46 incorporating such a controlling mechanism. Green reflected radiation 44 from the sea floor is fed into the receiver 46 using mirror 48. The green radiation is then focussed using primary and secondary mirrors 60 and 62 respectively, subsequently passing through shutter 64. Appropriate optical components such as filters 66 may be employed to modify the light entering the photomultiplier 68.

The shutter 64 is typically positioned at the near focal plane and includes a plurality of individual elements in the focal plane. Typically the shutter 64 includes a plurality of individual LCD elements. By turning those elements on or off, one can control the surface area of the shutter 64 through which light can pass. Since light reflected from different surface areas passes through the different locations in the shutter 64 this enables one to control from what area the sampled optical energy enters the photomultiplier 68 thus effectively steering the receiver 46.

Those skilled in the art will however appreciate that other mechanical devices may equally well control the shutter transparency and it is not intended to limit the invention to a LCD shutter. For example the shutter 64 may very well include micro-mirrors that reflect light at certain locations of the shutter.

This effectively provides one with the ability to steer the receiver 46 within a small angular range, and simultaneously control the shape, size, and sensitivity on a pulse-by-pulse basis.

Use of a LCD array allows one to control the receiver very quickly. Furthermore by adjusting the size and shape of the field of view one restricts the returned energy that is to be measured and hence removes spurious energy, such as sunlight noise. It therefore effectively improves the single to noise ratio to spurious out-of-signals.

Figure 3:
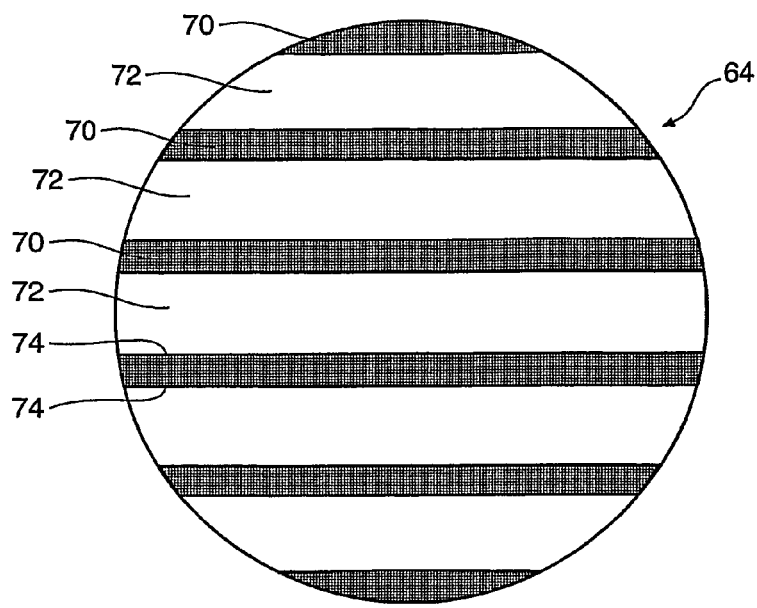
FIG. 3 is a schematic illustration of a first embodiment of a shutter embodying the present invention.

Illustrated in FIG. 3 is a shutter 64 having two sets of alternating bands 70 and 72 in a LCD element matrix acting much like a Venetian blind effect. Such a shutter is used to primarily control the relative spatial sensitivity of the receiver and does not steer it. The different height or thickness of the bands allows the user to select the relative spatial sensitivity of the receiver. Since the LCD matrices require electrical wiring, a small proportion of the surface area 74 between the bands is not controlled by the LCD elements. Thus with both sets of bands 70 and 72 closed, the shutter 64 still allows a few percent of light there through.

Typically the smaller bands 70 are some 0.5 mm in height, whilst the larger bands 72 are some 1.1 mm in height. When the smaller set of bands 70 are closed or are opaque to light, the larger bands allow some 70% of light to pass through shutter 64.

Alternatively when the smaller bands are transparent to light and the larger bands 72 are closed or opaque to light, the shutter allows some 36% of light to pass through.

The skilled addressee will appreciate that depending on the application, the actual geometry and dimension of the bands may indeed be customised. Thus the height of the bands may be varied to accommodate particular requirements and there may be more than two sets of bands. Further, in any one set, the bands may vary in their height across the shutter and not necessarily include sets of the same height. This type of construction is used when there are strong surface reflections that occur near the nadir position, such as may occur in very calm days and where only a small percentage of light needs to be transmitted through the centre of the shutter.

Figure 4:
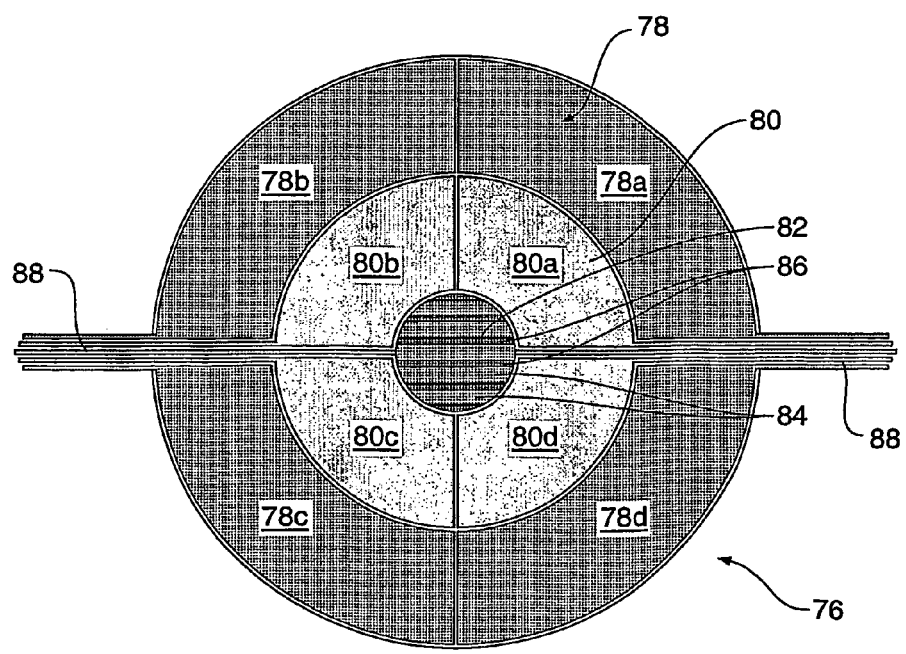
FIG. 4 is a schematic illustration of a second embodiment of a shutter embodying the present invention.
Figure 5:
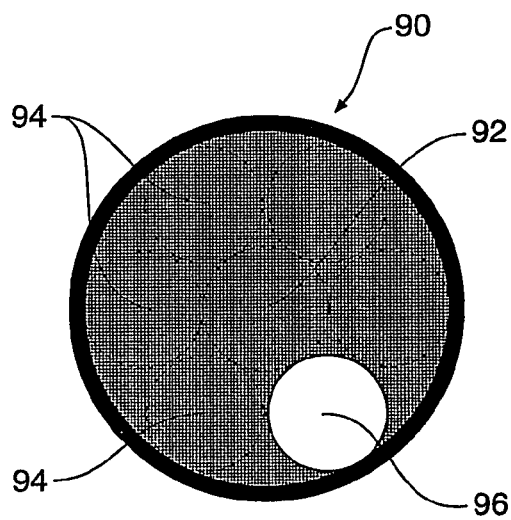
FIG. 5 is a schematic illustration of a third embodiment of a shutter embodying the present invention.

An alternate shutter construction is illustrated in FIG. 4 where shutter 76 includes individual inner and outer circular LCD matrix bands 78 and 80 each band having quadrants 78a, 78b, 78c, 78d, and 80a, 80b, 80c, and 80d respectively. The quadrants are symmetrically positioned around a central core 82 having two sets of parallel bands 84 and 86 as described above. The central core bands 84 and 86 are for use in calm conditions when there are strong nadir surface reflections. The embodiment of the shutter as illustrated in FIG. 4 enables the user to select optical energy passing through the outer and/or inner parts of the shutter 76. Control of the separate bands of the central shutter and the quadrants is achieved by the use of connections 88.

In using a LCD one can in-build polarising functions. The LCD could then be rotated to provide additional polarising capability. The LCD matrix may also provide a polarisation effect or polarization selection and by being rotatable one can optimise the required receiver polarization to remove any unwanted sunlight reflections or glint.

Use of a shutter having individual dot type LCD matrices that can be individually controlled allows one to select specific shutter characteristics that enable the user to control all of the previously mentioned characteristics.

For example as illustrated in FIGS. 5 to 8, the shutter 90 may be controlled to provide sizes, shapes, and locations of the field of view when individually controlling dot type LCD matrices or clusters of matrices. Thus in FIG. 5, the shutter 90 may be divided into a cluster of a central circular LCD array 92 circumferentially and symmetrically surrounded by same sized arrays 94. In this example, the user can then steer the receiver by allowing light to pass through only one of the arrays, such as array 96, whilst all the others are opaque.

Figure 6:
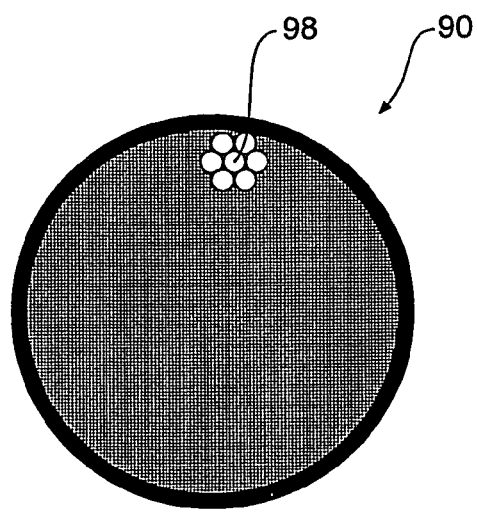
FIG. 6 is a schematic illustration of a fourth embodiment of a shutter embodying the present invention.
Figure 7:
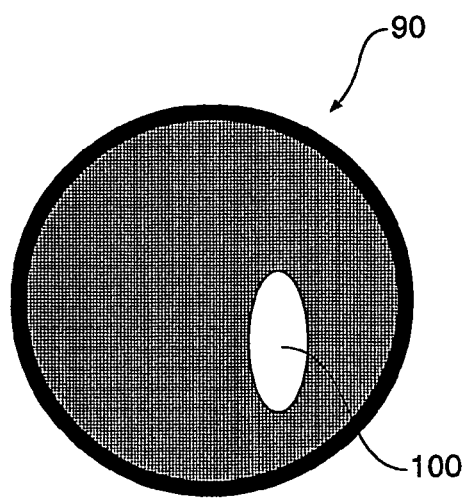
FIG. 7 is a schematic illustration of a fifth embodiment of a shutter embodying the present invention.
Figure 8:
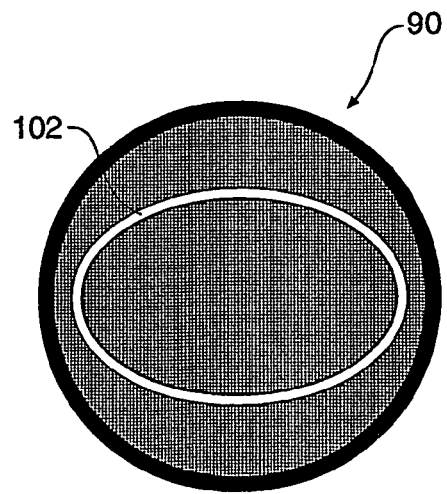
FIG. 8 is a schematic illustration of a sixth embodiment of a shutter embodying the present invention.

The size of the individual arrays may also vary between shutters as can be seen in FIG. 6 where the individual array 98 is relatively small compared to the absolute shutter size.

Utilising a shutter comprised of fast elements that either allow light to pass through or block it enable for the fine-tuning of the receiver. In some cases this may be extremely important when the field of view itself is not circular for the laser spot may be non-circular. Controlling individual LCD elements then enables for fine control of the field of view such as that illustrated in FIGS. 7 and 8 where light is allowed to pass through an elliptical area 100 in FIG. 7 and through an elliptical slit-type configuration 102 in FIG. 8. Thus the field of view provided may be circular or shaped to suit. For example one may be interested in slit-type arrangements, horizontal or vertical slits when one is using forward viewing.

It is to be understood that in some systems one may very well accommodate for different scenarios by having a plurality of in-line shutters mounted close to the field of view. Thus one shutter may very well be of the broad type configuration as in FIG. 3 whilst a following shutter may be of a fine configuration such as that of FIG. 6. The operator can then select which shutter they wish to use to effectively tune the receiver to operate the system in an optical configuration based upon the environmental conditions.

It will now be apparent to the skilled addressee that a receiver using an optical shutter according to the present invention enables the operator to control the sensitivity of the receiver as well as steer the received reflections to thereby optimise empirical measurements and taking into account the environmental operating conditions.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the fill scope of the claims so as to embrace any and all equivalent devices and apparatus.

The invention claimed is:

1. An optical shutter for selectively and controllably allowing the passage of optical radiation therethrough, the shutter comprising:
   a first shutter element and at least one second shutter element being positioned around said first shutter element, each of said first and second shutter elements having a first configuration in which optical radiation passes therethrough in a first pattern, and having a second configuration in which optical radiation passes therethrough in a second pattern, to shape and steer a reflected beam of optical radiation, and each of said first and second shutter elements having a third configuration blocking said optical radiation from passing therethrough, to control an area of the shutter where the reflected beam of optical radiation passes therethrough.

2. An optical shutter as in claim 1 wherein at least one of said first and second shutter elements further comprises a plurality of Liquid Crystal Display (LCD) elements.

3. An optical shutter as in claim 1 or 2 wherein said first shutter element is in a form of a central circle, and wherein said second shutter element is in a form of an inner ring surrounding said central circle, and further comprising a third shutter element in a form of an outer ring surrounding said inner ring.

4. An optical shutter as in claim 3 wherein said inner ring and said outer ring are further comprised of individual arrays of optical elements within each of said second and third shutter elements.

5. An optical shutter as in claim 4 wherein said arrays form quadrants of said inner ring and said outer ring.

6. An optical shutter as in claims 1 or 2, in which the first configuration and the second configuration provide different fields of view for the reflected beam of radiation.

7. An apparatus for the measurement of water depth between a water surface and water bottom said apparatus being adapted to be mounted on a flying platform above the water surface and said apparatus comprising:

a transmitter and a receiver of laser light having at least two wavelengths so as to receive a first reflection from the water surface and a second reflection from the water bottom;

a primary mirror adapted to oscillate in at least one axis so as to direct laser light to the water surface in a pattern and further adapted to receive a first reflection from the water surface and a second reflection from the water bottom;

a primary mirror adapted to oscillate in at least one axis so as to direct laser light to the water surface in a pattern and further adapted to receive said second reflection of the laser light from the water bottom and direct said second reflection to said receiver;

said receiver including an optical shutter including a first central circular shutter element, an inner annular shutter element circumferentially surrounding said circular element and an outer annular shutter element circumferentially surrounding said inner annular element, at least one of said shutter elements in said shutter selectively and controllably allowing the passage of said second reflection laser light therethrough in one of a plurality of selectable patterns, at least one of said shutter elements including a plurality of light blocking elements arranged in parallel and arcuate bands.

8. An apparatus as in claim 7 wherein said optical shutter selectively allows the passage of said second reflection at a rate that is synchronized with the oscillation frequency of said primary mirror.

9. An apparatus as in claim 7 wherein said at least one of said shutter elements includes a plurality of LCD elements in a parallel band type arrangement.

10. An apparatus as in any one of the claims 7 to 9 wherein said optical shutter is positioned at or near the focal plane of said receiver.

* * * * *